United States Patent
De Saint Salvy et al.

(10) Patent No.: US 9,883,136 B2
(45) Date of Patent: Jan. 30, 2018

(54) SYSTEM AND METHOD OF OUTPUTTING MULTI-LINGUAL AUDIO AND ASSOCIATED AUDIO FROM A SINGLE CONTAINER

(71) Applicant: DOLBY LABORATORIES LICENSING CORPORATION, San Francisco, CA (US)

(72) Inventors: Hugues A. De Saint Salvy, San Francisco, CA (US); Gregory John McGarry, Surry Hills (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 168 days.

(21) Appl. No.: 14/787,744

(22) PCT Filed: Apr. 8, 2014

(86) PCT No.: PCT/US2014/033349
§ 371 (c)(1),
(2) Date: Oct. 28, 2015

(87) PCT Pub. No.: WO2014/179003
PCT Pub. Date: Nov. 6, 2014

(65) Prior Publication Data
US 2016/0080685 A1    Mar. 17, 2016

Related U.S. Application Data (60) Provisional application No. 61/817,471, filed on Apr. 30, 2013.

(51) Int. Cl.
*H04N 5/92* (2006.01)
*H04N 5/928* (2006.01)
(Continued)

(52) U.S. Cl.
CPC ........... *H04N 5/91* (2013.01); *G11B 27/3027* (2013.01); *H04N 21/4302* (2013.01); *H04N 21/8106* (2013.01); *H04N 21/85406* (2013.01)

(58) Field of Classification Search
USPC ................................ 386/248, 334–340, 253
See application file for complete search history.

(56) References Cited

U.S. PATENT DOCUMENTS

| | | |
|---|---|---|
| 5,055,939 A | 10/1991 | Karamon |
| 5,289,288 A | 2/1994 | Silverman |

(Continued)

FOREIGN PATENT DOCUMENTS

| | | |
|---|---|---|
| JP | 2007-116649 | 5/2007 |
| WO | 95/12180 | 5/1995 |
| WO | 2008/023328 | 2/2008 |

OTHER PUBLICATIONS

Osawa, Hikaru, "Internet Streaming—Technology, Exemplary Use, and Expectation for the Year 2005—", 1st ed., Kyoritsu Publishing Co. Ltd., Jul. 15, 2000, pp. 39-51, ISBN:4-320-02978-X.

(Continued)

*Primary Examiner* — Nigar Chowdhury (57) ABSTRACT

A method of storing and outputting associated audio. The associated audio and the main audio are stored in, and output from, a single multimedia container. In this manner, when the main language is changed, the associated audio automatically changes with minimal audio artifacts.

20 Claims, 6 Drawing Sheets

(51) Int. Cl.
*H04N 5/91* (2006.01)
*H04N 21/43* (2011.01)
*H04N 21/81* (2011.01)
*H04N 21/854* (2011.01)
*G11B 27/30* (2006.01)

(56) References Cited

U.S. PATENT DOCUMENTS

| 6,442,335 | B1 | 8/2002 | Cookson |
| 8,131,785 | B1* | 3/2012 | Goel ................ G11B 27/3027 707/828 |
| 9,247,276 | B2* | 1/2016 | Hosur ................ H04N 7/17318 |
| 9,680,901 | B2* | 6/2017 | Harrison ............... H04L 65/607 |
| 9,712,843 | B2* | 7/2017 | Wang ................... H04N 19/597 |
| 2006/0092938 | A1* | 5/2006 | Gentrix ................... H04L 29/06 370/390 |
| 2007/0047912 | A1 | 3/2007 | Hattori |
| 2008/0267272 | A1* | 10/2008 | Kulessa ................ H04H 20/12 375/224 |
| 2009/0097821 | A1 | 4/2009 | Yahata |
| 2011/0069935 | A1 | 3/2011 | Baek |
| 2012/0066594 | A1 | 3/2012 | Gavade |
| 2012/0110618 | A1* | 5/2012 | Kilar ..................... G06Q 30/02 725/34 |
| 2012/0274850 | A1 | 11/2012 | Hawkins |
| 2012/0327996 | A1 | 12/2012 | Zimmerman |
| 2014/0304373 | A1* | 10/2014 | Tarbox ................... H04L 65/60 709/219 |

OTHER PUBLICATIONS

Kameyama, Wataru, et al "Impress Standard Textbook Series, Textbook for Digital Broadcasting in the IPTV Age", 1st ed., Impress R&D Co. Ltd., Apr. 1, 2010, p. 276, ISBN:978-4-8443-2853-7.

Kanno, Suguru et al "4-2 Media Encoding, Transmission, and Display", Imaging & Visual Computing, vol. 33, No. 6, The Institute of Image Electronics Engineers of Japan, Nov. 25, 2004, pp. 920-924.

"ITU-T Recommendation H.222.0 (May 2006)", [online], Jul. 24, 2007, ITU-T, pp. 63-65, 72, 136, [retrieved on Oct. 21, 2016], the Internet (URL: http://www.itu.int/rec/T-REC-H.222.0-200605-S/en).

Andersen, Robert L. et al "Introduction to Dolby Digital Plus, an Enhancement to the Dolby Digital Coding System" AES Convention, Oct. 2004.

ETSI TS 102 366 v1.2.1 "Digital Audio Compression (AC-3, Enhanced AC-3) Standard" Aug. 20, 2008, pp. 1-214.

* cited by examiner

Container 300
(physical view)

SYSTEM AND METHOD OF OUTPUTTING MULTI-LINGUAL AUDIO AND ASSOCIATED AUDIO FROM A SINGLE CONTAINER

CROSS REFERENCE TO RELATED APPLICATIONS

This application claims priority to U.S. Provisional Patent Application No. 61/817,471, filed on 30 Apr. 2013, which is hereby incorporated by reference in its entirety.

BACKGROUND

The present invention relates to audiovisual playback, with particular application to content downloaded from a computer network.

Unless otherwise indicated herein, the approaches described in this section are not prior art to the claims in this application and are not admitted to be prior art by inclusion in this section.

Consumers are increasingly obtaining content online via downloading or streaming, as opposed to buying physical media. Example online services that provide content include the Netflix Watch Instantly™ service, the Apple iTunes™ service, and the Amazon Instant Video™ service. Although streaming and downloading may be similar from an end user perspective, the technical difference is that the downloaded content is stored locally and then played back from the local storage. Progressive downloading, where the playback of content may be started while the download is still in progress, further contributes to the similarity to streaming from an end user perspective.

SUMMARY

An issue addressed by embodiments of the present invention concerns the associated audio related to the content. Associated audio may be audio description tracks for visually impaired users, director's commentary tracks, etc. Associated audio is differentiated from the main audio, which is the main soundtrack of the content, including the dialogue track, music soundtrack and effects soundtrack. For example, the AC3 digital audio compression standard defines two main and six associated services. The main audio services are complete main (CM) and music and effects (ME); the associated services are visually impaired (VI), hearing impaired (HI), dialog (D), commentary (C), emergency (E), and voice over (VO).

For physical media such as a digital video disc (DVD), the associated content (such as audio description) may be included on the physical media. However, such associated content may be in a separate container from the main audio, and in that container the associated content may have been pre-mixed with a lower quality (e.g., stereo) version of the main audio.

Alternatively for the DVD, the associated content may not be provided on the physical media itself, but may be obtained online via streaming or downloading. Thus, when the user switches to another language track, the DVD player device must coordinate new settings for two components: the DVD reader component for the new language track from the DVD, and either a network component (for streaming content) or hard drive component (for downloaded content) for the corresponding associated content. Besides coordination of the physical components themselves, the coordination must also account for the various software layers involved in the switching (device driver, operating system, DVD player device control program, etc.). If such coordination is imperfect, auditory artifacts such as pops or glitches may result, with a negative impact on the user experience.

The situation is similar for content obtained online when one server provides the main audio and another server provides the associated audio. For streaming content, the client player device must communicate the new streaming settings to the server devices, which may respond with their new streams starting at different times. For downloaded content, the client player device must coordinate new read settings for the local storage device, which may introduce auditory artifacts as the local storage device is read from new locations.

Finally, there may be user interface deficiencies, which require the settings of the associated content to be changed separately from changing the settings for the main content. For example, the user switches the main audio from English to French, but the associated content continues in English until it is separately changed. Another user interface deficiency concerns management of downloaded content. When the associated content is provided separately from the main content, the user must manage obtaining the main content and the associated content from their separate sources.

In response to the above-noted shortcomings, an embodiment of the present invention is directed to playing main content and associated content from a single media container file. The single container helps to ensure synchronization of the associated content to the main content as well as seamless transitions when adding playback of the associated content. An embodiment further automatically switches the associated content when the main content is switched (e.g., to output in another language). By using a single media container file, the media player device has a reduced incidence of auditory artifacts as compared to many existing systems.

According to an embodiment, a method outputs multi-lingual audio and associated audio. The method includes storing a multimedia container. The multimedia container includes a plurality of main audio data sets and a plurality of associated audio data sets. The plurality of main audio data sets and the plurality of associated audio data sets are in a plurality of languages. The method further includes receiving first selection information. The first selection information corresponds to a first selected language of the plurality of languages. The method further includes outputting a first audio data stream from the multimedia container. The first audio data stream corresponds to a first selected main audio data set of the plurality of main audio data sets in the first selected language. The method further includes receiving second selection information. The second selection information relates to the plurality of associated audio data sets. The method further includes outputting a second audio data stream from the multimedia container. The second audio data stream corresponds to a first selected associated audio data set of the plurality of associated audio data sets in the first selected language.

The method further includes receiving third selection information. The third selection information corresponds to a second selected language of the plurality of languages. The method further includes outputting a third audio data stream instead of the first audio data stream from the multimedia container. The third audio data stream corresponds to a second selected main audio data set of the plurality of main audio data sets in the second selected language. The method further includes automatically outputting a fourth audio data stream instead of the second audio data stream from the multimedia container. The fourth audio data stream corresponds to a second selected associated data set of the plurality of associated audio data sets in the second selected language.

An apparatus outputs multi-lingual audio and associated audio. The apparatus includes a processor and a storage device. The storage device is configured to store a multimedia container. The processor is configured to control the apparatus to perform processing that corresponds to the method described above.

A computer program controls an apparatus (including a processor and a storage device) for outputting multi-lingual audio and associated audio. The computer program controls the apparatus according to the method described above. The computer program is stored in a non-transitory computer readable medium.

The following detailed description and accompanying drawings provide a further understanding of the nature and advantages of the present invention.

DETAILED DESCRIPTION

Described herein are techniques for media playback. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

In the following description, various methods, processes and procedures are detailed. Although particular steps may be described in a certain order, such order is mainly for convenience and clarity. A particular step may be repeated more than once, may occur before or after other steps (even if those steps are otherwise described in another order), and may occur in parallel with other steps. A second step is required to follow a first step only when the first step must be completed before the second step is begun. Such a situation will be specifically pointed out when not clear from the context.

In this document, the terms "and", "or" and "and/or" are used. Such terms are to be read as having the same meaning; that is, inclusively. For example, "A and B" may mean at least the following: "both A and B", "only A", "only B", "at least both A and B". As another example, "A or B" may mean at least the following: "only A", "only B", "both A and B", "at least both A and B". When an exclusive-or is intended, such will be specifically noted (e.g., "either A or B", "at most one of A and B").

Overview and General Description

Figure 1:
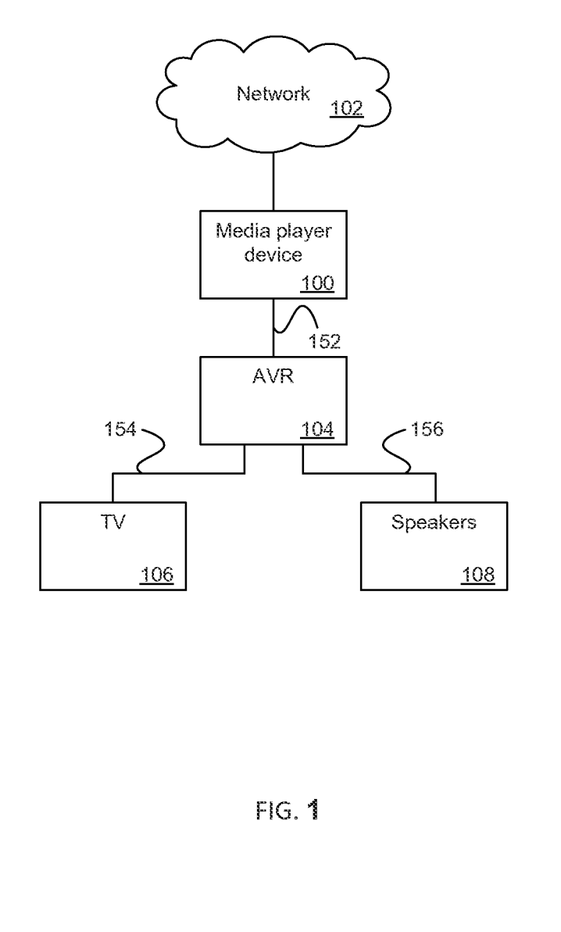
FIG. 1 is a diagram showing a media player device and related components.

FIG. 1 is a diagram showing a media player device 100 and related components, including a computer network 102 (e.g., the internet), an audio/video receiver (AVR) 104, a television 106 (e.g., a high-definition 1080p television), and one or more speakers 108. The components of FIG. 1 may be deployed in a user's home as a home theater system.

The media player device 100 generally interacts with the other components as follows. The media player device 100 accesses the computer network 102 for obtaining content or other information related to content. The media player device 100 outputs the content as video and audio signal 152 to the AVR 104. The connection between the media player device 100 and the AVR 104 may be a high definition media interface (HDMI) connection. The audio data in the signal 152 may be in pulse-code modulation (PCM) format. The AVR 104 interfaces between various content sources (such as the media player device 100, a DVD player device, a Blu-ray disc device, a compact disc (CD) player device, a radio receiver device, etc.) and various output devices (such as the television 106 and the speakers 108). The AVR 104 sends the video stream 154 to the television 106, for example via an HDMI connection. The AVR 104 sends the audio stream 156 to the speakers 108, as well as performs general amplification and driving functions for the speakers 108.

The makeup of the audio stream 156 will vary based upon the number and configuration of the speakers 108. For example, for a single speaker, the audio stream 156 may be a single mono audio channel. For two speakers, the audio stream 156 may be two stereo audio channels. The AVR 104 may send six channels in surround sound 5.1 format to six speakers (e.g., left, center, right, right-surround, left-surround, and subwoofer), or eight channels in surround sound 7.1 format to eight speakers.

The media player device 100 includes a processor, a memory, a network connection, and a storage system. In general, the storage system stores content that the media player device 100 obtains via the network connection, for example from the network 102. The media player device 100 then outputs the content as controlled by a media player control program. The control program may be implemented in software, firmware, hardware, or a combination thereof. A user may interact with the control program via a user interface. A Mac Mini™ computer from Apple Inc. may be used to implement the media player device 100. The control program may be implemented as an application running on the OS X operating system (Apple Inc.).

Alternatively, a general purpose computer may implement the media player device 100; the monitor for the computer may function as the television 106 and the computer speakers may function as the speakers 108. Similarly, a mobile device such as a mobile telephone or tablet computer may implement the media player device 100; the screen may function as the television 106 and built-in speakers or headphones may function as the speakers 108 and output a virtualized surround sound signal.

The media player device 100 may interact with various services (via the network 102) to obtain content, including the Netflix Watch Instantly™ service, the Apple iTunes™ service, and the Amazon Instant Video™ service.

Figure 2:
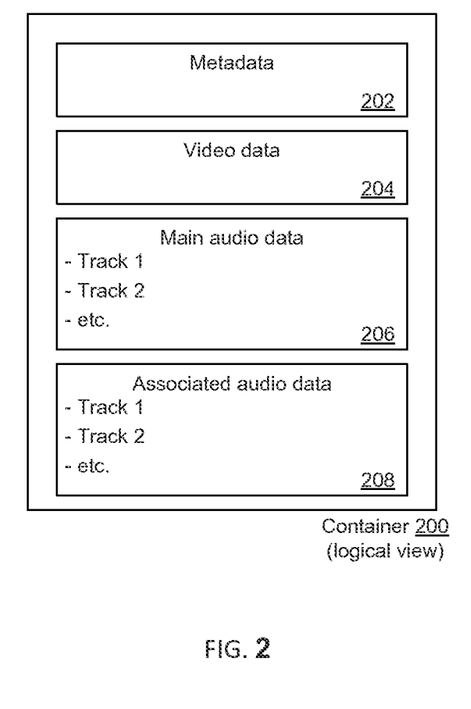
FIG. 2 is a diagram showing a logical arrangement of a container used by the media player device (see FIG. 1) to store content.

FIG. 2 is a diagram showing a logical arrangement of a container 200 used by the media player device 100 (see FIG. 1) to store content. In general, one container stores one movie or episode. The container 200 includes metadata 202, video data 204, main audio data 206, and associated audio data 208. The container 200 may also contain other data, a discussion of which is omitted for brevity. The metadata 202 defines and describes the container 200 and the content in the container 200. More specifically, the metadata 202 defines the locations of, and relationships between, the data of the container (e.g., the video data 204, the main audio data 206, and the associated audio data 208). The metadata 202 may include synchronization information that the media player device 100 uses to synchronize the reading of, the processing of, or the output of, the data of the container. The metadata 202 may also include other data about the container 200 or the content, such as the movie name, duration, menus, track listings, scene indexes, cover images, etc.

The video data 204 generally corresponds to the visual component of the content. For example, the video data 204 may be frames of video. The exact format of the video data 204 may vary according to various encoding and compression functions. For example, the video data 204 may be high-definition (HD) video, such as H.264, 1080p at 23.976 fps.

The main audio data 206 generally corresponds to the main soundtracks of the content. The main soundtracks generally include various dialogue tracks, where each dialogue track is in a different language. For example, for a movie produced in the United States, the default main soundtrack with have an English dialogue track; the other main soundtracks will have dialogue tracks in Spanish, French, German, Portuguese, Japanese, Korean, etc. Additionally, for a single language there may be multiple tracks, for example having different formats (e.g., 7.1 channel surround format, stereo format, etc.), bitrates (192 kbps, 384 kbps, etc.), etc.

The associated audio data 208 generally corresponds to additional audio tracks that go beyond the main audio tracks. One example of associated audio is audio description tracks (also referred to as "video description" or "Descriptive Video Service (DVS)"). The audio description tracks describe the video for visually-impaired users. There may be an audio description track that corresponds to each language of the main audio track. Another example of associated audio is a director's commentary track. Generally the director's commentary track is in a single language regardless of which main audio track is selected. In general, the director's commentary track is not output when the audio description track is output.

The main audio data 206 and the associated audio data 208 may be encoded in various formats. For example, the main audio data 206 may be encoded as 5.1 surround sound channel Dolby Digital Plus™ (DD+) format at 192 kbps, or as 7.1 surround sound channel DD+ format at 384 kbps, etc. The associated audio data 208 may be encoded as mono DD+ at 64 kbps, as stereo DD+ at 96 kbps, etc.

The container 200 may be arranged according to a standard format, for example, the Moving Pictures Experts Group version 4 (MPEG-4) Part 14 format, also referred to as the MP4 format.

In general, the associated audio data 208 has as many channels as, or fewer than, the main audio data 206. For example, if the main audio data 206 is in 5.1 channel format, then the associated audio data 208 may be in mono, stereo, 5.1 channel format, etc. If the main audio data 206 is in stereo format, then the associated audio data 208 may be in mono, stereo, etc., but not in 5.1 channel format.

In general, the video data 204 corresponds to a single video track, which is output concurrently with one of the dialogue tracks. Similarly, when enabled, one of the audio description tracks is output concurrently with the video track. Furthermore, the video and audio tracks are output synchronously, as further discussed below.

Figure 3A:
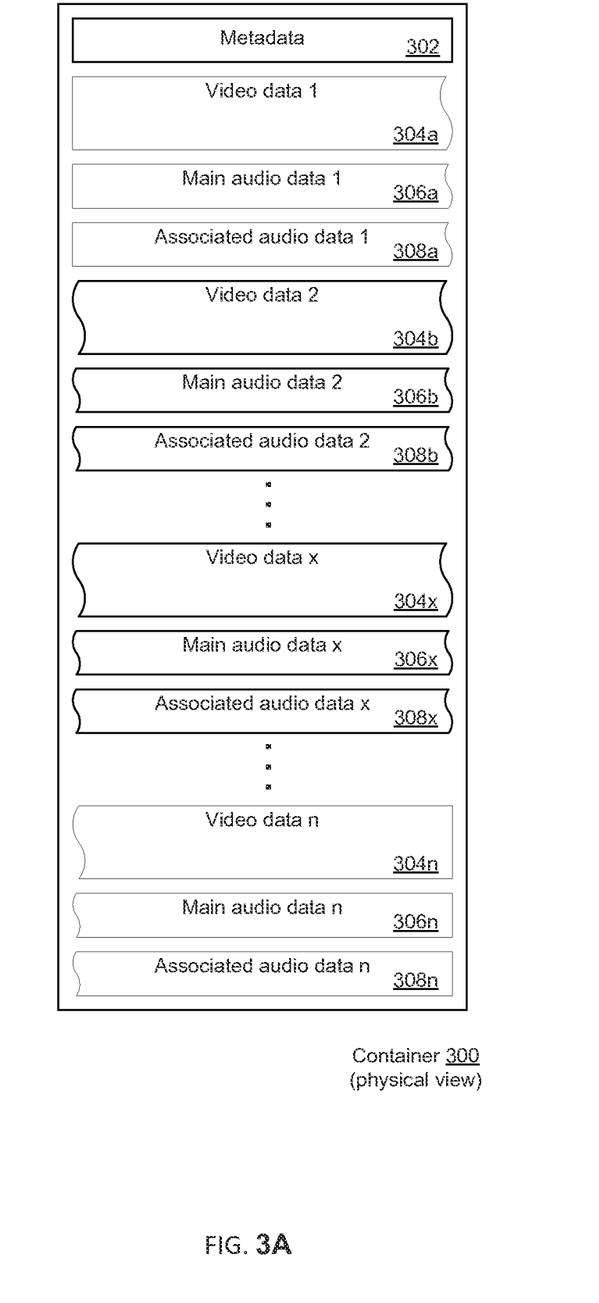
FIG. 3A is a diagram showing a physical arrangement of a container.

FIG. 3A is a diagram showing a physical arrangement of a container 300. Whereas FIG. 2 shows the logical structure, FIG. 3A shows the physical structure—how the data is physically stored or arranged in the container 300 (e.g., the container 200 is the logical view of the container 300). The metadata 302 is at the "beginning" (or "top" or "front") of the container 300. The video data 304 (304a, 304b, etc.), main audio data 306 (306a, 306b, etc.), and associated audio data 308 (308a, 308b, etc.) are then interleaved in sequential order following the metadata 302. In general, for a given portion of video data (e.g., 304a), the corresponding main audio data (e.g., 306a) and associated audio data (e.g., 308a) that are to be output synchronously (e.g., at the same time, concurrently, etc.) are interleaved before the next portion of video data (e.g., 304b).

This arrangement helps the media player device 100 (see FIG. 1) to perform progressive downloading. In progressive downloading, the media player device 100 first downloads the metadata 302, then progressively downloads the interleaved video data 304, main audio data 306, and associated audio 308; starting at the beginning of the content, and proceeding to the end in sequential order. This enables the media player device 100 to begin playing the content once a defined amount of data has been downloaded. For example, if the defined amount corresponds to 30 seconds of content, the media player device 100 may begin playing the content after it has downloaded the interleaved data portions corresponding to the first 30 seconds; in the first 30 seconds while that content is being output, the media player device 100 performs downloading of subsequent interleaved data portions; and so on. The defined amount may be adjusted according to various factors such as the connection speed to the network 102, the size of the content, etc.

Since each video data portion is in physical proximity to its corresponding main audio portion and corresponding associated audio portion, each of the three portions together may be read concurrently, processed, and output in synchrony.

Figure 3B:
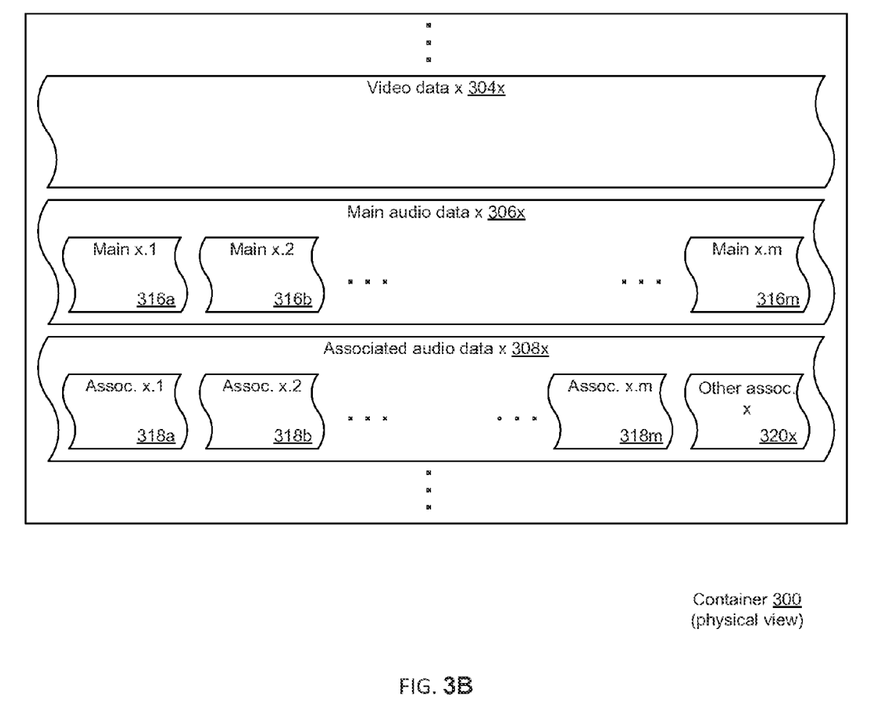
FIG. 3B shows more detail for the video data, main audio data and associated audio data shown in FIG. 3A.

FIG. 3B shows more detail for the video data, main audio data and associated audio data shown in FIG. 3A (e.g., 304x, 306x and 308x). As in FIG. 3A, the interleaved video data portion 304x is associated with the interleaved main audio data portion 306x and the interleaved associated audio data portion 308x. Within each audio data portion are the track portions. In general, FIG. 3B adds more detail to FIG. 3A by showing the plurality of main audio tracks and the plurality of associated tracks within each data portion.

More specifically, the main audio data portion 306x includes m main audio track portions 316a, 316b, 316m, etc. The m main audio track portions correspond to the m main soundtracks of the content. For example, the content may have three main soundtracks in three different languages for dialogue, in English, French and German. If the track portion 316a corresponds to English, then an aggregation of each of the main audio track portions in English from all of the interleaved main audio data portions 306 corresponds to the entire main dialogue track in English.

Similarly, the associated audio data portion 308x includes m associated audio track portions 318a, 318b, 318m, etc. that correspond to the m audio description tracks of the content. The associated audio data portion 308x may also include an other associated audio track portion 320x. The other associated audio track portion 320x may correspond to a director's commentary track. As with the main audio data portion 306x, the entire audio description track in a given language corresponds to an aggregation of each of the associated audio track portions (e.g., 318a) for that language from all of the interleaved associated audio data portions 308.

Figure 4:
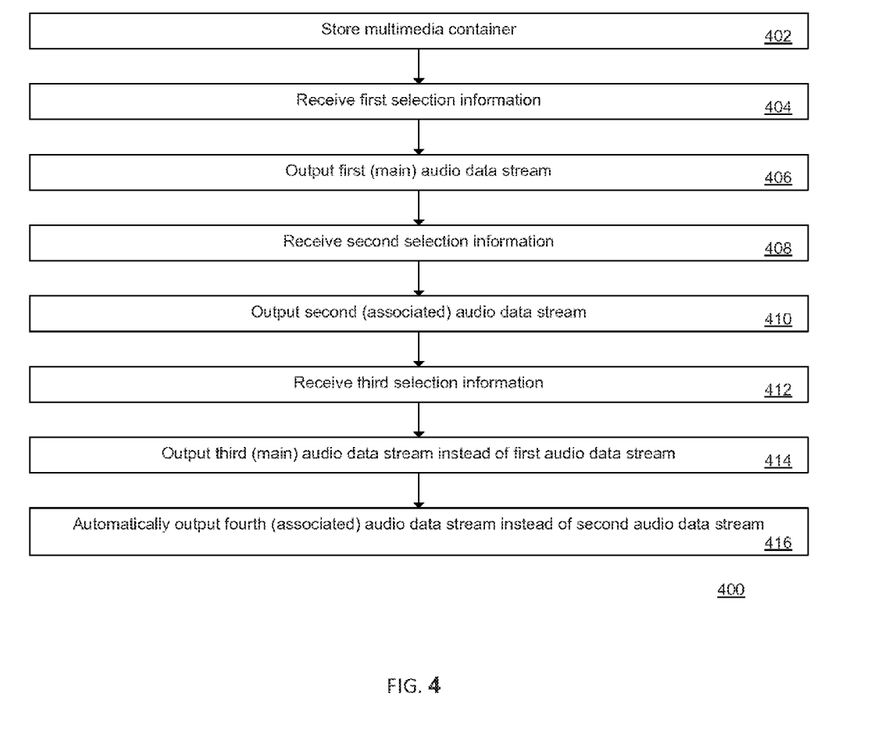
FIG. 4 is a flowchart of a method of outputting multi-lingual audio and associated audio.

FIG. 4 is a flowchart of a method 400 of outputting multi-lingual audio and associated audio. The method 400 may be implemented by the media player device 100 (see FIG. 1), for example as controlled by one or more computer programs.

At 402, a multimedia container is stored. The multimedia container includes main audio data sets and associated audio data sets. The main audio data sets and the associated audio data sets are in a plurality of languages. The multimedia container may be similar to the containers 200 and 300 (see FIGS. 2-3). The multimedia container may be stored according to progressive downloading.

At 404, first selection information is received. The first selection information corresponds to a first selected language of the plurality of languages. For example, the default setting for the first selection information may be for English (or another default language), as specified by the metadata in the container. As another example, the user may provide the first selection information by selecting a language from a number of available languages, as displayed by the user interface of the media player device 100. As a further example, the first selection information may be set according to a previous user selection for content in a previous container.

At 406, a first audio data stream is output from the multimedia container. The first audio data stream corresponds to a first selected main audio data set of the main audio data sets in the first selected language. For example, the media player device 100 may output the first audio data stream as one of the video and audio streams 152 to the AVR 104 (see FIG. 1).

At 408, second selection information is received. The second selection information relates to the associated audio data sets. For example, the user may provide the second selection information by indicating the audio description is to be turned "on" by interacting with the user interface of the media player device 100.

At 410, a second audio data stream is output from the multimedia container. The second audio data stream corresponds to a first selected associated audio data set of the associated audio data sets in the first selected language. For example, if the user selected French in 404, the audio description is output in French as well.

At 412, third selection information is received. The third selection information corresponds to a second selected language of the plurality of languages. For example, if the default in 404 was English, the user may provide the third selection information by selecting German via the user interface of the media player device 100.

At 414, a third audio data stream is output instead of the first audio data stream from the multimedia container. The third audio data stream corresponds to a second selected main audio data set of the main audio data sets in the second selected language. For example, if the user selected German in 412, the main audio switches to German.

At 416, a fourth audio data stream is automatically output instead of the second audio data stream from the multimedia container. The fourth audio data stream corresponds to a second selected associated audio data set of the associated audio data sets in the second selected language. Note that the switching is "automatic" because the user does not need to re-enable the audio description (done in 408) or to select the new language for the audio description as an additional action. For example, if the user selected German in 412, the audio description automatically switches to German as well.

Referring back to FIG. 3B, since the associated audio portions are interleaved with the main audio portions, when the user changes the language selection (see 412), smooth switching results in the language for both the dialogue track and the audio description track because the portions are in physical proximity. In addition, since the main audio data and the associated audio data are in a single container (see FIG. 2), the same software and hardware layers (as managed by the media player control program) are involved for both when a language switch occurs, further contributing to the smooth switching.

Media Player Details

This section provides additional details regarding the media player device 100 (see FIG. 1).

Figure 5:
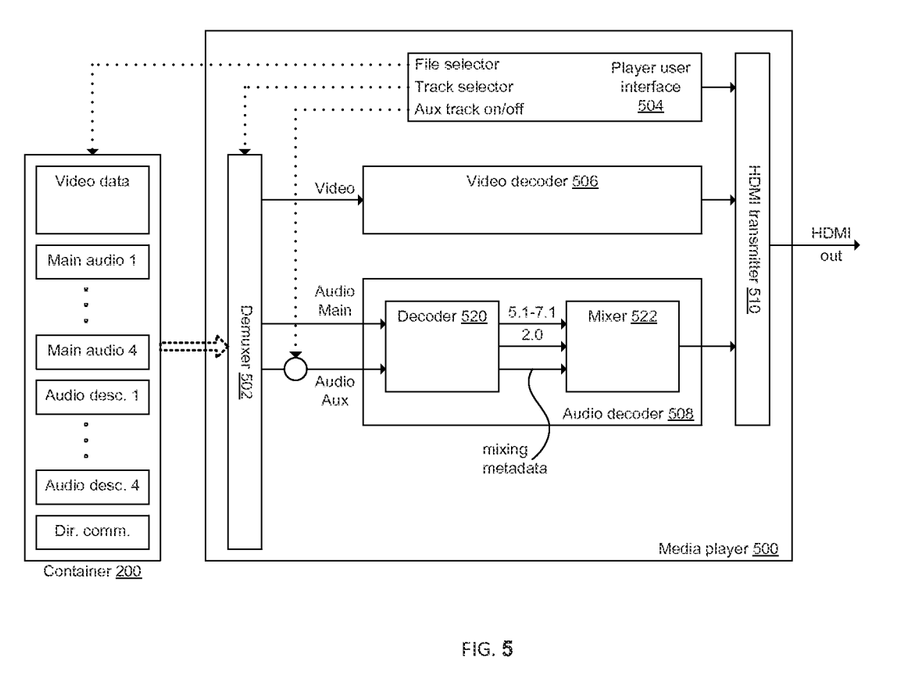
FIG. 5 is a block diagram of a control program for the media player device (see FIG. 1).

FIG. 5 is a block diagram of a control program 500 (also referred to as the media player application, the media player, or simply "the application") for the media player device 100 (see FIG. 1). The control program 500 controls the media player device 100 to operate as a fully functional Dolby Digital Plus enabled media player. As discussed above (see FIG. 1), the control program 500 may be executed by a Mac Mini computer (e.g., model identifier: Macmini5.1) connected to a 7.1 channel AVR and a 1080p TV display. The application may be written to operate on OS X 10.8.x (Mountain Lion). The application may be a 64-bit application.

The application 500 includes a demuxer component 502, a user interface component 504, a video decoder 506, an audio decoder 508, and an HDMI transmitter component 510. The demuxer component 502 reads the video and audio data in the container 200 and demultiplexes the various audio streams as directed by the user interface component 504. The demuxer component 502 provides the selected audio streams to the audio decoder 508, and provides the video stream to the video decoder component 506.

The user interface component 504 receives various user selections such as a file selection to choose one of the available containers, a track selector to select the dialogue track, whether audio description is enabled, and whether the director's commentary is enabled. The user interface component 504 also implements other player functionality as selected by the user such as play, pause, seek, etc. and sends corresponding control signals to the other components.

The video decoder component 506 reads the video data in the container 200, decodes the video data, and provides the decoded video data to the HDMI transmitter component 510.

The audio decoder component 508 may be a DD+ audio decoder, and includes a decoder 520 and a mixer 522. The decoder 520 may be a DD+ dual channel decoder. The decoder 520 receives the selected main data track and the selected associated data track, and decodes them into pulse-coded modulation (PCM) data and mixing metadata. The mixer 522 receives the PCM data and the mixing metadata from the decoder 520, mixes the PCM data according to the mixing metadata, and provides the mixed audio data to the HDMI transmitter component 510.

The HDMI transmitter component 510 receives the decoded video data and the mixed audio data, and packages this data as an HDMI output signal for output from the media player device 100.

The application controls the media player device 100 to operate as a fully functional audio/video player with the following basic playback capabilities: play, pause and scrubber (seek functionality). The media player supports decoding DD+ audio (5.1 and 7.1 channels). The application outputs multichannel PCM audio via the HDMI output (when a multichannel AVR is connected).

The media player parses the source container (e.g., MP4 file) and identifies the various main tracks and their language, as well as the various associated audio tracks. The media player supports switching between the available main audio tracks. The media player supports dual-decoding of two DD+ audio tracks (e.g., main audio in 5.1/7.1, and associated audio in mono). In the case of dual-decoding, the media player mixes the main and associated audio to create a mixed audio (e.g., 5.1 or 7.1, depending on the main audio).

When multiple audio description tracks are present for a title (e.g. there is a matching audio description track for each language in the main audio soundtrack), the application automatically picks the proper audio description track under the hood, i.e. shall automatically select the audio description track with the same media-language tag as the currently active (playing) main audio soundtrack. If only one audio description track is present, the application enables this audio description track (according to user selection) regardless of the language of the main audio.

The application supports content types as follows. One supported type is content with only one audio description track (despite multiple languages for the main audio). Another supported type is content with a matching number of audio description tracks and main audio tracks, and matching languages (i.e. for every main audio language, there is a corresponding audio description track in this same language). In either case, there could also be a director's commentary track; the content support described above is specifically about the number of audio description tracks, not about the number of secondary audio tracks.

The application is able to identify the language of each audio track in the container (for example by relying on the media-lang metadata tag). The application is able to identify between an "audio description" associated audio track and between a "director's commentary" associated audio track, and other types of associated audio content as well. For example, the metadata may include tags related to DD+ track format, such as the "bsmod" tag, that the application uses to identify the type of associated audio content.

The media player ensures that the mixed audio output does not clip or overload.

The application is able to downmix source content to a 5.1 channel output or to a stereo output. The application is able to recognize that a downstream AVR is only connected to a 5.1 channel speaker system and is able to downmix any 7.1 channel audio content down to 5.1. The application is able to recognize that only a stereo output is available, and is able to downmix any 5.1 channel or 7.1 channel audio content down to stereo.

The audio decoder 508 defaults to operate in Line mode dynamic range control (DRC) with 0% scale factors (i.e. maximum dynamic range). The application is able to switch to radio frequency (RF) mode DRC or Portable mode DRC.

The application responds to input events from the following sources: mouse movements and clicks, keyboard mappings, and infrared signals (e.g., a remote control such as Apple Remote™ device). Alternatively, when the application is implemented by a mobile device, the application responds to touch inputs.

The application automatically supports the display resolution at startup (to match the native resolution of the display device, e.g. the TV connected via HDMI). The application launches in full-screen right at startup and operates in full-screen; alternatively the application may launch and operate in a window. At startup, the application scales video playback to match the screen such that the entire video is being displayed and such that the aspect ratio of the video is being preserved. There is no requirement to adapt dynamically at runtime to changes in the resolution of the display.

During playback, when the end of the content is reached, the application automatically returns to the content selection screen.

The application displays the OS X system menu bar when the mouse cursor is kept at the top of the screen for more than 1 s; in this case, the application shall be able to be terminated by clicking on: DD+ Movies>Quit DD+ Movies.

An installer for the application is not required, however it is desirable if the installation of the application requires to place associated resources in a specific location on the file system (as opposed to the resources being bundled inside of the application package).

The application is responsive to user interaction at all times. Navigating the application user interface UI (e.g. cycling between the available movies, or navigating the playback menus) is smooth and fluid, and is not sluggish. The state of the user interface controls (e.g. highlighted vs. non-highlighted) is immediately updated (e.g., less than 200 ms) to reflect user action, without lag.

Audio and video remain in sync at all times, even after switching audio tracks multiple times or enabling and disabling associated audio tracks multiple times.

Selecting a new language track switches from the current audio track to the new one quickly and without pops or glitches. When switching to a new language track, audio playback with the new track resumes immediately or in less than 1 second. If switching to the new audio track requires more than 200 milliseconds, the video stream pauses until it can resume together with the audio, so that audio content is not lost.

Selecting an associated audio track automatically mixes in that track with the main audio without pops and glitches. When enabling or disabling an associated audio track, the operation of enabling this track, playback of the mixed audio resumes immediately or after no more than 1 second.

The user interface control bar's gradual fade in and fade out is animated in a smooth and fluid manner. Where applicable, the user interface also uses graceful animations for screen transitions, e.g. when cycling up and down through the available movies, when transitioning from the content selection screen to the playback screen and vice versa (horizontal slide animation), and when displaying or hiding the pull-up menus in the UI control bar (slide up/down animation).

While moving the seek handle left and right, the video display updates regularly, for example showing the I-frames in the video, so that the user has visual feedback on which part of the clip corresponds to the seek.

User Interface Details

The user interface of the application may be in a variety of states. These states include the initial screen at launch (state 1) and the playback screen (state 2).

State 1: Initial Screen at Launch

When the application launches, the first view presents the movie assets that are available for viewing, along with relevant technical information about the movies, in particular the audio content. Only one movie title is presented on-screen at any given time, to maximize the screen real estate, although the adjacent movie titles posters are slightly visible (dimmed) above and/or below the currently visible movie poster. The user can click with the mouse pointer on those dimmed out movie posters above or below the current title to cycle through the movies. In addition to the mouse, the user can select from the various movie titles as follows: by pressing the up or down arrow keys on the keyboard, or by pressing the up or down button on the remote control.

The application transition from one movie to another as follows. When the user clicks on a dimmed poster above or below the current movie, first the text disappears. Second, the movie poster in the center gradually becomes dimmed. Third, all the movie posters slide up or slide down until the poster for the new movie that was clicked is in the center of the screen. The slide animation uses an ease-in/ease-out timing curve, i.e. the animation speed is fastest in the middle and tapers down at the beginning and the end. Fourth, the new clicked movie poster gradually goes to full brightness. Fifth, the new corresponding text appears. All these steps can happen simultaneously, or at least with some overlap (e.g., the text can disappear at the same time as the movie becomes dimmed). Alternatively, as a movie poster slides up from the center, its reflection on the shelf slides down proportionally. And likewise, as a new movie poster slides down towards the shelf, its reflection slides up until it meets the bottom of the poster.

The user can select a movie by clicking on the movie poster with the mouse, pressing Enter on the keyboard and/or pressing "Enter" or "Play" on the remote control. This will immediately trigger playback of the movie, using the default settings for languages and extras (e.g., audio description, etc.). Playback may start from the beginning of the movie. Alternatively, playback starts according to "resume where I left off" functionality.

State 2: Playback Screen

When playback begins, a control bar is displayed on-screen, overlaid on top of the video frames. The control bar fades away after 3 seconds unless there are new events (mouse movements/clicks, keyboard input, remote signals, etc.). New input events either maintain the control bar on-screen or bring it back if it had faded away. The controls on the control bar include a Play/Pause toggle control, a Language track selection menu button, an Extras selection menu button, a seek bar, and an exit button.

The user interface generally operates as follows. The user can click on the buttons in the control bar using the mouse pointer. The user can also use the keyboard arrows to navigate between the different controls and can use the Enter key to activate a control. The user can also press the Space bar on the keyboard. This acts as a direct control to the Play/Pause functionality, regardless of where the user is in the control menu. Pressing the Spacebar should not bring the control bar back on-screen if it had faded away; it should simply pause or resume playback.

The user can also navigate between the different controls using the arrow buttons on the remote control and use the select button to activate a control. The user can also press the play/pause button on the remote to act as a direct control to the Play/Pause functionality, regardless of where the user is in the control menu. Pressing the play/pause button on the remote should not bring the control bar back on-screen if it had faded away; it should simply pause or resume playback.

The user can use the mouse pointer to select the position button in the seek bar and drag it left or right to move to a different place in the movie. The image on-screen periodically tracks the moving position of this button, even if the mouse click was not released. Upon release, playback of synchronized audio and video resumes from the new position. The user shall also be able to exercise this seek functionality by pressing and holding the "right" or "left" button on the remote control. The "right" button shall move the position button forward in the movie, while the "left" button shall move the position backward. The position button shall move gradually by a pre-defined increment (e.g., 10 seconds of increment every half-second that the button is maintained pressed). The increments may be a unit of time or a pre-defined number of I-frames of video to skip. There is no need for the seek bar to be controllable using the keyboard input method.

When one of the menu buttons for Languages or Extras is activated (e.g., clicked), the menu for this control slides up from the menu button, while video playback continues underneath the overlaid controls. Once the menu has completed the slide-up transition, the areas on this menu become navigable by using the up/down arrows on the keyboard or remote, or by using the mouse pointer.

A sub-menu item can be selected by pressing Enter on the keyboard, "select" on the remote, or by clicking with the mouse. When the item is being clicked/selected/confirmed, the color of the text in this menu sub-item shall be briefly highlighted in blue to confirm the user selection, before returning to the default text color. The sub-menu panel also automatically slides back down after 1 second.

When a menu button on the user interface control bar is active (e.g., the mouse is hovering over the button, or the user has pressed the arrow keys on the remote or keyboard such that a given button is ready to be selected/activated), that button appears in a highlighted state. The currently selected/active item in the submenu appears highlighted as well, until a new selection is made.

In general, the navigation of the controls does not interrupt video and audio playback (unless the Exit button is activated).

The default language is the first language track. Clicking on a new language immediately switches the soundtrack to this channel. The default for extras is "Off" (e.g., no director's commentary or audio description track should be active).

According to an embodiment, only one of the extras is active at any given time. Clicking on the director's commentary sub-item immediately starts mixing of this track with the main audio track. Clicking on the audio description sub-item immediately stops mixing the director's commentary track and starts mixing in the appropriate audio description track instead. Clicking on "Off" turns off any associated audio track. No more than one associated audio track should be active at a time.

When a menu panel has been displayed, clicking "Esc" on the keyboard, or "Menu" on the remote, cancels the menu selection and close the menu panel.

Clicking the Exit button interrupts playback and takes the user back to the initial movie selection screen, displaying the last movie that was selected. The Exit control can also be activated by pressing the Escape (Esc) key on the keyboard or by pressing the "menu" button on the remote control.

User Interface Graphic Assets Features

The user selects the content to view by reviewing a graphic for the movie poster and its related description.

Preferences Window

The application has a "Preferences" window accessible either using the menu bar (click on the application name and select the "Preferences . . . " menu item) or using the "⌘," keyboard shortcut. The application's Preferences window is not modal (i.e. it allows the user to keep viewing and interacting with the rest of the application, in order to understand the impact of the various settings). In general, the application's Preferences window is not be resizable, and its zoom and minimize buttons are disabled. When the application's Preferences window is closed and reopened, it should reopen to the same pane that was selected when the user closed it, at least while the application remains running. When the user makes changes to settings in the preferences window, the changes take effect immediately, without requiring the user to click an OK or Apply button and without waiting for the user to close the window. The preferences/settings set by the user are persistent (i.e. they remain in force for the entire session of the application as well as after the application is terminated and relaunched).

The application's Preferences window shall have a user interface that conforms to the following description for the "General" preference pane. The General preference pane includes a drop-down menu to select the preferred language, radio buttons to select the dynamic range compression (line mode, RF mode, and portable mode), and a drop-down menu to select the number of output channels (7.1, 5.1, stereo, mono, etc.). The General pane of the application's Preferences window offers the ability to change the DRC profile for the DD+ decoder, choose the output channel configuration and select a preferred (default) language.

The control for the default/preferred language track defaults to English, and may offer at a minimum the following choices: English, French, German, Spanish. The application obeys the control for the default/preferred language by automatically selecting the default language track when first starting playback of a movie (if this language is available). During playback of a clip/movie, if the user selects a different language than the default, this new language is remembered for the duration of the session (i.e. until the application is terminated).

The control for the dynamic range compression defaults to "Line Mode" DRC with 0% scale factors (i.e. maximum dynamic range). The scale factor is adjustable using a slider in increments of 1, between 0 and 100. The control offers the ability to change the DRC profile to RF Mode or to Portable Mode. When "Portable Mode" is selected, a drop-down menu offers the ability to select the Portable Mode output level between –8, –11 and –14 LKFS (with –11 LKFS as the default). When Portable Mode is not selected, the drop-down menu is disabled. When Line Mode is not selected, the slider for the scale factors is disabled. The application obeys the DRC profile set by the user.

The application's Preferences window offers the ability to change the number of output channels for the application, between a stereo (2 channel) output, a 5.1 channel output and a 7.1 channel output. When 5.1 or 7.1 is selected, the application outputs the audio only via the HDMI output. When 5.1 is selected, any main or secondary audio track is downmixed to 5.1 in the decoder (i.e. only the independent substream is decoded) prior to reaching the mixer. When Stereo is selected, any main or secondary audio track is downmixed to stereo in the DD+ decoder prior to reaching the mixer. The application outputs the stereo audio over the HDMI link as well as the headphone port, Sony/Philips Digital Interconnect Format (S/PDIF) output, and built-in speakers when applicable.

Streaming

Although the progressive downloading features of the media player device 100 have been described above, it may also be configured to operate with streaming content (e.g., hypertext transfer protocol (HTTP) live streaming (HLS) from Apple Inc.).

Implementation Details

It should be understood that the various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, solid-state drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the invention in the context of one or more stand-alone computer systems, the invention is not so limited, but rather may be implemented in connection with any computing environment, such as a network or distributed computing environment. Still further, aspects of the invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

As a specific example, the media player device 100 (see FIG. 1) may execute software or firmware that controls its operation, for example to receive, process and output the video and audio data as described above. The device 100 may include, be connected to, or be controlled by, a computer that is connected via the internet to one or more other computers.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method of outputting audio, comprising:
    progressively downloading a plurality of main audio data sets from a first server and a plurality of associated audio data sets from a second server, wherein the plurality of main audio data sets and the plurality of associated audio data sets are not interleaved on the first server and the second server;
    storing a multimedia container, wherein the multimedia container includes:

the plurality of main audio data sets and the plurality of associated audio data sets, wherein the plurality of main audio data sets and the plurality of associated audio data sets are in a plurality of languages and data elements of the plurality of main audio data sets are interleaved with data elements of the plurality of associated audio data sets in the multimedia container; and synchronization information that synchronizes one of the plurality of main audio data sets and one of the plurality of associated audio data sets;

receiving first selection information, wherein the first selection information corresponds to a first language of the plurality of languages;

outputting a first audio data stream from the multimedia container after a defined amount of the multimedia container has been progressively downloaded and as the multimedia container is being progressively downloaded, wherein the first audio data stream corresponds to a first main audio data set of the plurality of main audio data sets in the first language; and outputting a second audio data stream from the multimedia container concurrently with outputting the first audio data stream according to the synchronization information, wherein the second audio data stream corresponds to a first associated audio data set of the plurality of associated audio data sets in the first language.

2. The method of claim 1 further comprising:
receiving second selection information, wherein the second selection information relates to the plurality of associated audio data sets;
receiving third selection information, wherein the third selection information corresponds to a second selected language of the plurality of languages;
outputting a third audio data stream instead of the first audio data stream from the multimedia container, wherein the third audio data stream corresponds to a second selected main audio data set of the plurality of main audio data sets in the second selected language; and
automatically outputting a fourth audio data stream instead of the second audio data stream from the multimedia container, wherein the fourth audio data stream corresponds to a second selected associated data set of the plurality of associated audio data sets in the second selected language.

3. The method of claim 2, wherein automatically outputting the fourth audio data stream comprises:
automatically outputting the fourth audio data stream from the multimedia container concurrently with outputting the third audio data stream.

4. The method of claim 2, further comprising:
concurrently reading the data elements of the second selected main audio data set and the data elements of the second selected associated audio data set.

5. The method of claim 2, wherein automatically outputting the fourth audio data stream comprises:
automatically outputting the fourth audio data stream from the multimedia container concurrently with outputting the third audio data stream according to the synchronization information.

6. The method of claim 2, further comprising:
concurrently reading data elements of the second selected main audio data set and data elements of the second selected associated audio data set according to the synchronization information.

7. The method of claim 2, wherein the multimedia container includes metadata that relates to the plurality of main audio data sets and the plurality of associated audio data sets, further comprising:
outputting the second audio data stream from the multimedia container concurrently with outputting the first audio data stream, in accordance with the metadata.

8. The method of claim 2, wherein the plurality of associated audio data sets includes a director's commentary data set, further comprising:
receiving fourth selection information, wherein the fourth selection information corresponds to the director's commentary data set;
outputting a fifth audio data stream instead of the fourth audio data stream from the multimedia container, wherein the fifth audio data stream corresponds to the director's commentary data set.

9. The method of claim 1, further comprising:
concurrently reading the data elements of the first main audio data set and the data elements of the first associated audio data set.

10. The method of claim 1, further comprising:
concurrently reading data elements of the first main audio data set and data elements of the first associated audio data set according to the synchronization information.

11. The method of claim 1, wherein one of the plurality of associated audio data sets is associated with one of the plurality of main audio data sets, and wherein a number of channels of the one of the plurality of associated audio data sets is not greater than a number of channels of the one of the plurality of main audio data sets.

12. The method of claim 1, wherein the multimedia container includes metadata that relates to the plurality of main audio data sets and the plurality of associated audio data sets.

13. The method of claim 1, wherein the multimedia container includes metadata that relates to the plurality of main audio data sets and the plurality of associated audio data sets, wherein the metadata includes the synchronization information.

14. The method of claim 1, wherein the multimedia container includes metadata that relates to the plurality of main audio data sets and the plurality of associated audio data sets, further comprising:
interleaving data elements of the plurality of main audio data sets with data elements of the plurality of associated audio data sets in the multimedia container, in accordance with the metadata.

15. The method of claim 1, wherein the plurality of associated audio data sets include a plurality of audio description data sets.

16. The method of claim 1, wherein playback of a video stream is paused when switching from the first audio data stream to the third audio data stream requires more than a defined period.

17. The method of claim 1, wherein switching from the second audio data stream to the fourth audio data stream has smooth switching without audio artifacts.

18. The method of claim 1, wherein the data elements of the plurality of main audio data sets and the data elements of the plurality of associated audio data sets are interleaved in the multimedia container according to a physical arrangement wherein a portion of the data elements of the plurality of main audio data sets and a corresponding portion of the data elements of the plurality of associated audio data sets that are to be output synchronously are interleaved before a next portion of video data.

19. An apparatus for processing a multimedia container, the apparatus comprising:
- a processor configured to progressively download a plurality of main audio data sets from a first server and a plurality of associated audio data sets from a second server, wherein the plurality of main audio data sets and the plurality of associated audio data sets are not interleaved on the first server and the second server;
- a storage device that is coupled to the processor and that is configured to store a multimedia container, wherein the multimedia container includes the plurality of main audio data sets, the plurality of associated audio data sets and synchronization information, wherein the plurality of main audio data sets and the plurality of associated audio data sets are in a plurality of languages and data elements of the plurality of main audio data sets are interleaved with data elements of the plurality of associated audio data sets in the multimedia container, and wherein the synchronization information synchronizes one of the plurality of main audio data sets and one of the plurality of associated audio data sets; and
- an audio decoder that outputs a first and second audio data stream from the multimedia container, concurrently, according to the synchronization information, after a defined amount of the multimedia container has been progressively downloaded and as the multimedia container is being progressively downloaded, wherein the first audio data stream corresponds to a main audio data set of the plurality of main audio data sets in a first language, and the second audio data stream corresponds to an associated audio data set of the plurality of associated audio data sets in the first language.

20. A computer program stored in a non-transitory computer readable medium for controlling an apparatus including a processor and a storage device for outputting multilingual audio and associated audio, to execute processing comprising:
- progressively downloading a plurality of main audio data sets from a first server and a plurality of associated audio data sets from a second server, wherein the plurality of main audio data sets and the plurality of associated audio data sets are not interleaved on the first server and the second server;
- storing a multimedia container, wherein the multimedia container includes:
  - the plurality of main audio data sets and the plurality of associated audio data sets, wherein the plurality of main audio data sets and the plurality of associated audio data sets are in a plurality of languages and data elements of the plurality of main audio data sets are interleaved with data elements of the plurality of associated audio data sets in the multimedia container; and
  - synchronization information that synchronizes one of the plurality of main audio data sets and one of the plurality of associated audio data sets;
- receiving first selection information, wherein the first selection information corresponds to a first language of the plurality of languages; and
- outputting a first audio data stream from the multimedia container after a defined amount of the multimedia container has been progressively downloaded and as the multimedia container is being progressively downloaded, wherein the first audio data stream corresponds to a first main audio data set of the plurality of main audio data sets in the first language; and
- outputting a second audio data stream from the multimedia container concurrently with outputting the first audio data stream according to the synchronization information, wherein the second audio data stream corresponds to a first associated audio data set of the plurality of associated audio data sets in the first language.

* * * * *